April 18, 1967 J. B. JAMES 3,315,238

MATRIX DRIVING ARRANGEMENT

Filed Jan. 21, 1963 2 Sheets-Sheet 1

INVENTOR
JOHN BERNARD JAMES
BY Hane and Nydick
ATTORNEYS

April 18, 1967 J. B. JAMES 3,315,238

MATRIX DRIVING ARRANGEMENT

Filed Jan. 21, 1963 2 Sheets-Sheet 2

INVENTOR
JOHN BERNARD JAMES
BY Haue and Nydick
ATTORNEYS

United States Patent Office 3,315,238

Patented Apr. 18, 1967

3,315,238

MATRIX DRIVING ARRANGEMENT

John Bernard James, Stevenage, England, assignor to International Computers and Tabulators Limited Filed Jan. 21, 1963, Ser. No. 252,957
Claims priority, application Great Britain, Feb. 8, 1962, 4,857/62
6 Claims. (Cl. 340—174)

Figures 1, 2, 3:
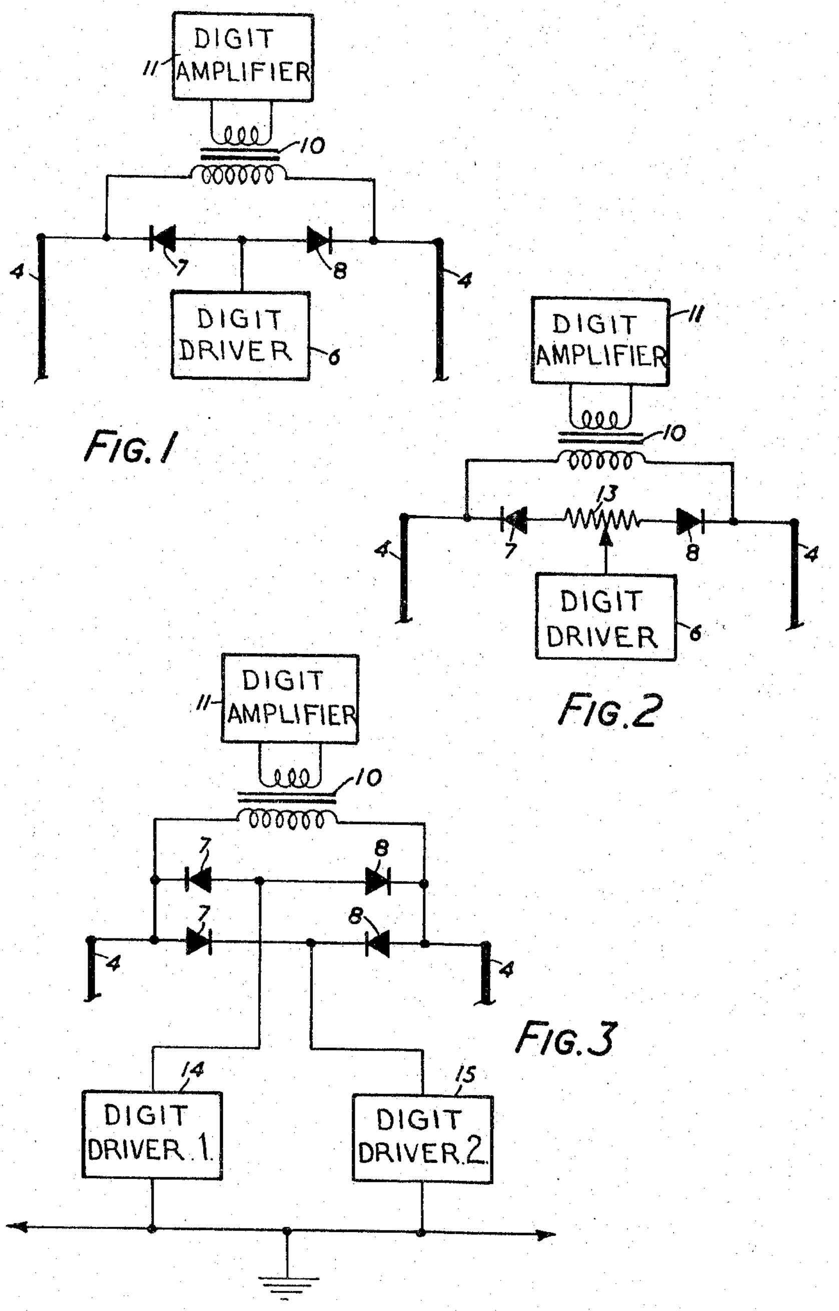

This invention relates to information storage devices.

Various forms of storage device are known in which a single conductor is coupled to a plurality of bistable storage elements and is used as a common conductor for both writing and reading. The storage elements may be magnetic storage cores or areas of thin magnetic film. The single conductor usually forms the column conductor for one column of a matrix of storage elements.

Each storage element in such a matrix is coupled to a column and a row conductor. An element is set to a desired state by applying currents simultaneously to the associated row and column conductors. The state of the element is read by applying a current to the row conductor only and detecting the voltage which is induced in the column conductor by any change of state of the storage element. This induced voltage is relatively small. It may be no more than a few millivolts in a store employing thin film elements. This induced voltage has to be amplified to produce a usable output signal.

The writing current which is applied to the column conductor is typically a pulse of about .6 amp. with a duration of several hundred nanoseconds. The column conductor has a small inductance, but it is sufficient for the rapid fall of the writing current pulse to produce a substantial back voltage across the ends of the column conductor. This voltage, which may be as much as ten volts, will be referred to as the disturbance voltage. The disturbance voltage will decay exponentially to zero.

The column conductor is used as a sense conductor during the reading operation. The disturbance voltage prevents a reading operation being started immediately after a writing operation for two reasons. Firstly, the voltage which is induced in the column conductor by the switching of a storage element during a reading operation is of the order of millivolts. Consequently, the disturbance voltage must be allowed to decay to such a value that it does not interfere with the small voltages generated during the reading operation. Secondly, a sense amplifier is permanently connected to each column conductor. The sense amplifiers are designed to amplify the small voltages generated during reading. The large disturbance voltage may drive the early stages of an amplifier into saturation. This makes the amplifier insensitive to small voltages until the amplifier stages have returned to their normal operating condition.

The effects of the disturbance voltage determine the earliest possible time at which a reading operation can commence after the end of the writing operation which has produced the disturbance voltage. Hence, the effects set a lower limit to the time required for a complete cycle of the store, which consists of a write operation and a reading operation.

It has been proposed that the effect of the disturbance voltage should be reduced by dividing the column conductor into two equal sections which are driven in parallel. The two sections are connected to the reading amplifier in such a way that the two disturbance voltages are in opposition. The disturbance voltage applied to the amplifier can be reduced from 10 volts to, say, 0.5 volt by careful balancing of the two sections. However, this residual voltage may still be substantial compared with the voltage induced during reading. Consequently, although the balanced system provides an appreciable improvement, the operating speed of the store may still be limited by this disturbance voltage. Furthermore, this improvement requires accurate balancing of the two sections, which is not easy to achieve in a large store.

It is an object of the invention to provide an improved and simplified arrangement for reducing the effect of the disturbance voltage.

According to one aspect of the invention an information storage device includes storage elements arranged in two groups, each group being associated respectively with a separate one of two drive conductors, means for supplying a driving current to both the driving conductors in common, said supply means including a source of driving current connected to a pair of matched non-linear impedance devices, the driving conductors being connected each to different one of the pair and a common output circuit connected between the respective junctions of the impedance devices and the corresponding conductors.

According to another aspect of the invention the information storage device includes storage elements arranged in two groups, all the elements of each of the groups being coupled in common to a separate one of two drive conductors associated respectively with the groups, a source of driving current, at least one pair of matched diodes connected between said current source and the driving conductors to apply a current to the conductors to control switching of the elements, the diodes respectively each being connected to a corresponding one of the conductors and being poled to present a low impedance to voltages appearing across the conductors due to changes in the current, and a common output circuit connected between the respective junctions of the diodes and conductors such that said voltages are in opposition in the output circuit.

Figure 4:
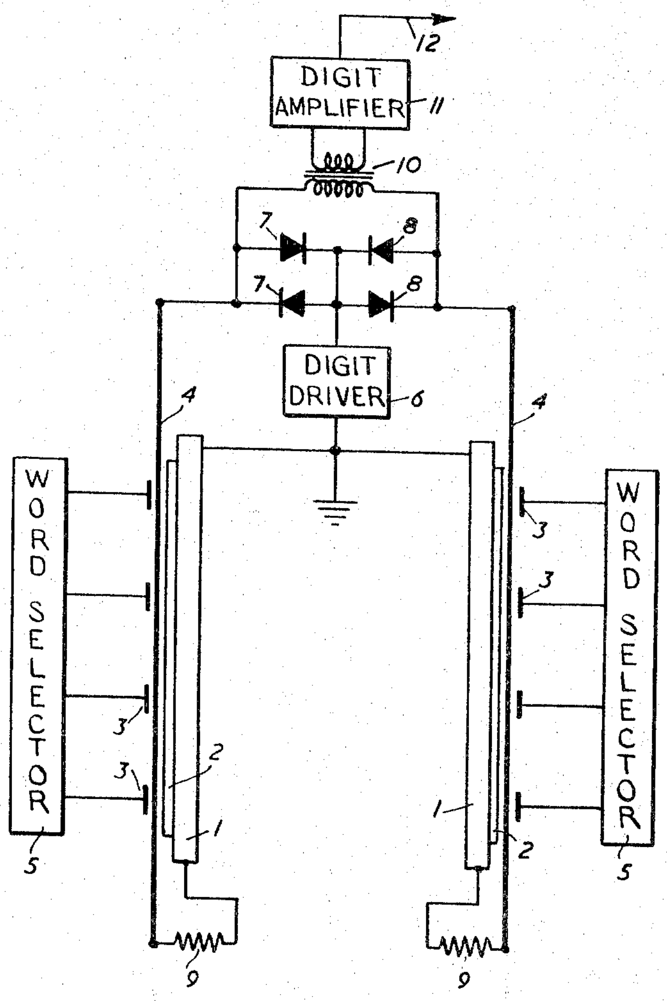

Apparatus embodying the invention will now be described by way of example, with reference to the accompanying drawings, in which, FIGURE 1 shows a storage device driving arrangement in schematic form, FIGURE 2 shows an alternative driving arrangement, FIGURE 3 shows a further arrangement, and FIGURE 4 shows yet another arrangement applied to a thin film storage device.

Referring now to FIGURE 4, the thin film storage device consists of a number of matrix plates which may have a construction and mode of operation generally similar to that described in an article entitled "Making Reproducible Magnetic-Film Memories," by E. M. Bradley, published in "Electronics" for Sept. 9, 1960, pp. 78–81. Briefly, each matrix plate, of which two are shown in the figure, consists of an aluminum substrate 1, a deposited magnetic film 2, and a matrix of word and digit drive conductors 3 and 4, respectively. The word drive lines 3 are connected to a conventional word selection matrix 5. The digit drive lines or conductors 4 of a pair of plates are connected to a digit driver 6. Writing into the store may be effected in the manner described in the article previously referred to, or by the use of bi-directional digit currents as described in British patent specification No. 942,561.

In order to read a stored word, a drive current is applied to the appropriate word line. A separate sense line was used in the store described in the article, whereas the present arrangement utilises the digit drive line as a sense line. One end of each digit drive line is connected to the digit driver 6 through pairs of oppositely poled diodes 7 and 8. The other end of each digit drive line is connected to the plate 1, which is earthed, through a terminating resistor 9.

It will be appreciated that the use of two pairs of diodes 7 and 8 as shown in the figure allows the use of bi-directional digit driver currents as indicated above. However, where the mode of operation of the storage device requires the use only of uni-directional drive currents only a single pair of diodes 7 and 8 are required as indicated in FIGURE 1. In this case the diodes of the pair are each poled to allow the digit drive current to flow to the drive conductors 4.

In either case, the primary winding of an output transformer 10 is connected between the conductors 4 by connections to the junctions of the diodes of the pair, or pairs, with these conductors. The secondary winding of the transformer is connected to the input of a conventional digit signal amplifier 11, which provides an amplified output signal on line 12.

The forward voltage drop across any one of the diodes 7 or 8 is about 0.5 volt or less, and is largely independent of the total voltage drop across the associated digit drive conductor 4, because a current source is used for driving. The effective voltage across the primary of the transformer 10 is the difference between the forward voltages across each of the diodes 7 and 8 of a pair. The pairs of diodes are matched, that is they are selected for uniformity of forward voltage drop and hole storage. It has been found that the diodes may easily be matched in this way to provide a balance to within 5 millivolts, with a voltage drop across the drive lines of the order of 10 volts. Diodes with low hole storage are necessary because of the high switching speeds.

In order to provide even greater matching of the forward voltage drop, or to allow greater tolerances on the selection of diodes to constitute a matched pair the connection of the digit driving current source 6 to the diodes of a pair may be modified as indicated in FIGURE 2. In this case a low resistance potentiometer 13 is provided to connect the diodes of the pair and the output of the source 6 is connected to the slider of this potentiometer.

It will also be apparent that instead of using a single driving current source 6 to provide bidirectional currents where the mode of operation of the storage device requires them, two separate current sources may be used. This arrangement is shown in FIGURE 3. The two sources 14 and 15 respectively are each connected to a matched pair of diodes 7 and 8 as described above, and the diodes of the pair are appropriately poled to allow the required current flow. It will also be realised that, as noted above, a potentiometer may be used in the connection between each of these current sources and their associated diode pairs.

It will be appreciated that the diodes 7 and 8 are devices exhibiting a non-linear voltage/current characteristic and thus effectively exhibit non-linear impedance characteristics during operation of the storage device. For example, the voltage induced in a digit conductor 4 during reading is of the order of a few millivolts. Under these conditions a diode presents a relatively high impedance to voltages of this magnitude induced on the associated conductor 4 due to a reading operation. Consequently, the induced voltage appears across the primary of the transformer 10 without any appreciable loss due to the diodes. Thus, it will be appreciated that the use of the diodes improves the balance by a factor of one hundred or more, compared with the conventional balanced circuit, and it does not interfere with the operation of the circuit during reading.

It is desirable that the pair of digit drive conductors 4, associated with a diode pair, should be approximately balanced, but the accuracy of balancing can be much less than is necessary with the conventional circuit.

It will be appreciated that, in practice, a store will usually consist of many storage plates and that each of the digit drive lines will be coupled to half of the total number of plates. There will be as many pairs of digit lines as there are digits in the words being stored, each pair of lines being connected as previously described. The store is in two halves for balancing the digit drive lines. However, the digit drive lines of a pair are effectively connected in parallel, so that the two halves are treated as a single store for selection purposes, and only one word position can be written into, or read from, at a time.

Although the invention has been described as applied to a thin film matrix store, it will be appreciated that it is equally applicable to other stores, such as magnetic core stores, in which a conductor is provided for both driving and sensing the storage elements.

I claim:

1. An information storage device including storage elements arranged in two groups; a first drive conductor coupled to all the elements of one group; a second drive conductor coupled to all the elements of the other group; a source of driving current; a first diode connected between said source and one end of said first conductor; a second diode forming a matched pair with said first diode and connected between said source and one end of said second conductor, said first and second diodes passing current from said source through both said first and second conductors simultaneously for each energization of said source, and having a low impedance to voltages appearing across said conductors due to changes in said current; and a common output circuit connected between said one end of said first conductor and said one end of said second conductor such that said voltages are in opposition in said output circuit.

2. Apparatus as claimed in claim 1 in which the connection to the diode pair to the current source comprises a resistor linking the pair of diodes and a connection from the current source to an intermediate point on the resistor.

3. Apparatus as claimed in claim 1 in which the output circuit includes a transformer and the primary winding of the transformer is connected between the driving conductors.

4. Apparatus as claimed in claim 1 in which the storage elements are areas of bistable ferromagnetic thin film supported on conductive substrates and in which the drive conductors are connected at the end remote from the current source through a terminating resistor to return paths which respectively include the substrates.

5. Apparatus as claimed in claim 1 in which the source of current is arranged selectively to supply a current flowing in one of opposite directions and in which two pairs of oppositely poled matched diodes are connected between the current source and the conductors.

6. Apparatus as claimed in claim 5 in which the source of current includes two driving current generators respectively arranged to generate currents flowing in opposite directions.

References Cited by the Examiner

UNITED STATES PATENTS

| | | | |
|---|---|---|---|
| 3,032,749 | 5/1962 | Newhouse | 340—174 |
| 3,034,107 | 5/1962 | Knowles | 340—174 |
| 3,096,510 | 7/1963 | Lee | 340—174 |
| 3,112,470 | 11/1963 | Barrett | 340—174 |
| 3,144,641 | 8/1964 | Raffel | 340—174 |
| 3,192,510 | 6/1965 | Flaherty | 340—174 |

BERNARD KONICK, *Primary Examiner.*

G. LIEBERSTEIN, M. S. GITTES, *Assistant Examiners.*